US009879187B2

United States Patent
Bhan

(10) Patent No.: US 9,879,187 B2
(45) Date of Patent: Jan. 30, 2018

(54) HYDROPROCESSING CATALYST, METHOD OF MAKING, AND PROCESS FOR TREATING HEAVY HYDROCARBON FEEDSTOCKS

(71) Applicant: SHELL OIL COMPANY, Houston, TX (US)

(72) Inventor: Opinder Kishan Bhan, Katy, TX (US)

(*) Notice: Subject to any disclaimer, the term of this patent is extended or adjusted under 35 U.S.C. 154(b) by 291 days.

(21) Appl. No.: 13/869,353

(22) Filed: Apr. 24, 2013

(65) Prior Publication Data

US 2013/0284640 A1 Oct. 31, 2013

Related U.S. Application Data

(60) Provisional application No. 61/638,710, filed on Apr. 26, 2012.

(51) Int. Cl.
*B01J 23/28* (2006.01)
*B01J 21/12* (2006.01)
(Continued)

(52) U.S. Cl.
CPC ............ *C10G 45/08* (2013.01); *B01J 23/002* (2013.01); *B01J 23/882* (2013.01); *B01J 23/883* (2013.01);
(Continued)

(58) Field of Classification Search
CPC B01J 2523/00; B01J 2523/51; B01J 2523/68; B01J 2523/845; B01J 2523/847;
(Continued)

(56) References Cited

U.S. PATENT DOCUMENTS 4,066,574 A * 1/1978 Tamm ........................ 502/220
4,976,848 A 12/1990 Johnson
(Continued)

FOREIGN PATENT DOCUMENTS

CN 1050736 3/2000
CN 101516500 8/2009
(Continued)

OTHER PUBLICATIONS

Studies in Surface Science and Catalysis, Upgrading Heavy Petroleum Feeds, 2007, vol. 169, Edward Furimsky, ed., pp. 23-41.*
(Continued)

*Primary Examiner* — Renee Robinson
*Assistant Examiner* — Derek Mueller
(74) *Attorney, Agent, or Firm* — Charles W. Stewart

(57) ABSTRACT

A catalyst for treating heavy hydrocarbon feedstocks. The catalyst comprises a calcined particle comprising a co-mulled mixture made by co-mulling inorganic oxide powder, molybdenum trioxide powder, and a nickel compound or cobalt compound, or both compounds, and then forming the co-mulled mixture into a particle that is calcined to provide the calcined particle. The calcination is conducted at a temperature such that at least 20% of the pore volume of the calcined particle is in pores of greater than 5,000 Å and less than 70% of the pore volume of the calcined particle is in the pores having a pore size in the range of from 70 to 250 Å.

18 Claims, 4 Drawing Sheets

(51) Int. Cl.
*C10G 45/10* (2006.01)
*B01J 37/04* (2006.01)
*B01J 35/10* (2006.01)
*C10G 45/08* (2006.01)
*B01J 23/882* (2006.01)
*B01J 27/19* (2006.01)
*B01J 35/00* (2006.01)
*B01J 23/883* (2006.01)
*B01J 37/00* (2006.01)
*B01J 23/00* (2006.01)
*B01J 27/199* (2006.01)

(52) U.S. Cl.
CPC ............ *B01J 27/19* (2013.01); *B01J 27/199* (2013.01); *B01J 35/0006* (2013.01); *B01J 35/1019* (2013.01); *B01J 35/1042* (2013.01); *B01J 35/1061* (2013.01); *B01J 35/1071* (2013.01); *B01J 37/0009* (2013.01); *B01J 37/0036* (2013.01); *B01J 37/04* (2013.01); *C10G 45/10* (2013.01); *B01J 2523/00* (2013.01); *C10G 2300/202* (2013.01); *C10G 2300/205* (2013.01)

(58) Field of Classification Search
CPC ........ B01J 23/002; B01J 23/883; B01J 27/19; B01J 27/199; B01J 35/0006; B01J 35/1019; B01J 35/1042; B01J 35/1061
See application file for complete search history.

(56) References Cited

U.S. PATENT DOCUMENTS

| | | | |
|---|---|---|---|
| 6,030,915 | A | 2/2000 | De Boer |
| 6,127,299 | A | 10/2000 | De Boer et al. |
| 7,820,036 | B2 | 10/2010 | Bhan |
| 7,824,541 | B2 | 11/2010 | Bhan |
| 7,871,513 | B1 | 1/2011 | Bhan |
| 8,372,268 | B2 | 2/2013 | Ginestra et al. |
| 2008/0149531 | A1 | 6/2008 | Roy-Auberger et al. |
| 2009/0255851 | A1 | 10/2009 | Bhan et al. |

FOREIGN PATENT DOCUMENTS

| | | |
|---|---|---|
| CN | 102046286 | 4/2011 |
| CN | 102387859 | 2/2015 |

OTHER PUBLICATIONS

Walendzieski, J., Physicochemical Properties HDS Activity of CoMo-P-Al2O3, React. Kinet. Catal. Lett. 1991, vol. 43, No. 1, pp. 107-113.*

Nakamura, H. et al., Development of Hydrodesulfurization Catalyst Using Comparative Model Feed Reactions and Quantum Chemical Studies, 18th Saudi Arabia-Japan Joint Symposium, 2008, pp. 1-10.*

* cited by examiner

HYDROPROCESSING CATALYST, METHOD OF MAKING, AND PROCESS FOR TREATING HEAVY HYDROCARBON FEEDSTOCKS

PRIORITY CLAIM

This application claims priority to U.S. Provisional Application Ser. No. 61/638,710 filed Apr. 26, 2012, the entire disclosure of which is hereby incorporated by reference.

FIELD OF THE INVENTION

This invention relates to a hydroprocessing catalyst and a hydrotreating process for the treatment of heavy hydrocarbon feedstocks.

BACKGROUND OF THE INVENTION

In the refining of crude oils the heavy cuts including residue often are subjected to catalytic hydroprocessing to remove such components as sulfur, nitrogen, metals (e.g., nickel or vanadium, or both), and Conradson carbon through desulfurization, denitrogenation, demetallization, or asphaltene conversion or any combination thereof. Various types of heterogeneous hydroprocessing catalysts are used to promote these reactions by contacting the catalyst with feedstock under conditions of elevated temperature and pressure and in the presence of hydrogen.

A number of hydroprocessing catalysts have been described in the past to improve the hydroprocessing of heavy feedstocks. These include, e.g., U.S. Pat. No. 6,030,915 (de Boer) and U.S. Pat. No. 6,127,299 (de Boer et al.) which disclose grinding and mixing of waste catalyst particles to form new catalysts for hydroprocessing of heavy hydrocarbons.

Another hydroprocessing catalyst is disclosed in U.S. Pat. No. 7,824,541 (Bhan) that is particularly useful in the treatment of distillate feedstocks to manufacture low-sulfur distillate products. This catalyst is a co-mulled mixture of molybdenum trioxide, a Group VIII metal compound, and an inorganic oxide material. The co-mulled mixture is calcined. The molybdenum content of the catalyst is in the range of from 10.5 to 33 wt. %, calculated as an oxide. If the Group VIII metal component is nickel, it is present in the catalyst in the range of from 3.8 to 15.3 wt. %, calculated as an oxide. The catalyst also has a mean pore diameter that is in a specific and narrow range of from 50 to 100 angstroms. There is less than 4.5 percent of the total pore volume that is contained in its macropores having pore diameters greater than 350 angstroms and less than 1 percent of the total pore volume contained in its macropores having pore diameters greater than 1000 angstroms.

Disclosed in U.S. Pat. No. 7,820,036 (Bhan) is a catalyst useful in the hydroprocessing of a heavy hydrocarbon feedstock wherein the catalyst comprises a calcined mixture made by calcining a formed particle of a mixture comprising molybdenum trioxide, a nickel compound, and an inorganic oxide material. The catalyst may be made by mixing an inorganic oxide material, molybdenum trioxide, and a nickel compound to form a mixture that is formed into a particle and calcined to provide a calcined mixture. The process involves the hydrodesulfurization and hydroconversion of a heavy hydrocarbon feedstock which process may include the conversion of a portion of the pitch content of the heavy hydrocarbon feedstock and the yielding of a treated product having an enhanced stability as reflected by its P-value. The catalyst is made by a method comprising co-mulling an inorganic oxide material, molybdenum trioxide, and a nickel compound to form a mixture; forming said mixture into a particle; and calcining said particle to provide a calcined mixture having a pore size distribution such that at least 70% of the total pore volume of said calcined mixture is in the pores of said calcined mixture having a pore diameter in the range of from 70 Å to 150 Å.

Disclosed in U.S. Pat. No. 7,871,513 (Bhan) is a catalyst that is useful in the hydroprocessing of heavy hydrocarbon feedstocks. This catalyst is a calcined mixture made by calcining a formed particle of a mixture comprising molybdenum trioxide, a nickel compound, and an inorganic oxide material. The molybdenum content of the catalyst is in the range upwardly to 18 wt. %, calculated as an oxide. The nickel content of the catalyst is in the range upwardly to 5.1 wt. %, calculated as an oxide. The molybdenum source used in the preparation of the catalyst is in the form of molybdenum trioxide that is in a finely divided state.

While the aforementioned catalysts have been shown to have good hydroprocessing activity, there are continuing efforts to find new or improved catalyst compositions having increased catalytic activity or improved stability, or both. Any improvement in catalyst activity can result in the lowering of required reactor temperatures in order to obtain a product of a given nitrogen, sulfur, asphaltene, or metal content from a feedstock that is contaminated with these components. The lower reactor temperatures provide for energy savings and will extend the life of a catalyst. There also are ongoing efforts to find more economical methods of manufacturing the catalyst compositions.

Heavy hydrocarbon feedstocks such as vacuum tower bottoms and resides are typically more difficult to hydrotreat to remove such components as sulfur, nitrogen, metals and carbon than the lighter distillate and naphtha feedstocks. Specially designed catalysts that are different from those used for treating the lighter hydrocarbon feedstocks can be required in order to more economically treat the heavier hydrocarbon feedstocks. So, there is an ongoing need to find new or improve catalyst compositions that have good properties for the hydroprocessing of heavy hydrocarbon feedstocks.

It is, therefore, desirable to provide an improved hydroprocessing catalyst having good catalytic activity and stability and which can be economical to manufacture. One particular desire is to provide a hydroprocessing catalyst that is particularly useful in the hydroprocessing of heavy hydrocarbon feedstocks, and, especially such feedstocks that have exceptionally high sulfur and metals, e.g., nickel and vanadium, concentrations.

SUMMARY OF THE INVENTION

Thus, accordingly, provided is a hydroprocessing catalyst for treating heavy hydrocarbon feedstocks. The catalyst comprises a calcined particle comprising a co-mulled mixture made by co-mulling inorganic oxide powder, molybdenum trioxide powder, and Group VIII metal particles and then forming the co-mulled mixture into a particle that is calcined to provide the calcined particle. The calcined particle has a pore structure such that at least 20% of its total pore volume is contained in pores having pore diameters greater than 5,000 Å and less than 70% of its total pore volume is contained in pores having pore diameters in the range of from 70 Å to 250 Å, as measured by mercury penetration.

The hydroprocessing catalyst is made by co-mulling inorganic oxide powder, molybdenum trioxide powder, and Group VIII metal particles to form a co-mulled mixture. The co-mulled mixture is formed into a particle that is calcined under a controlled temperature condition at a calcination temperature in the range of from 482° C. (900° F.) to 787.7° C. (1450° F.) for a calcination time period so as to provide a calcined particle having a pore structure such that at least 20% of its total pore volume is contained in pores having pore diameters greater than 5,000 Å and less than 70% of its total pore volume is contained in pores having pore diameters in the range of from 70 Å to 250 Å, as measured by mercury penetration.

The hydroprocessing catalyst can be used in a process for treating heavy hydrocarbon feedstocks and, in particular, for treating such feedstocks that have significant concentrations of vanadium. This process comprises contacting the catalyst under suitable hydroprocessing conditions with the heavy hydrocarbon feedstock having contaminating concentrations of metals and sulfur to yield a treated product.

DETAILED DESCRIPTION OF THE INVENTION

Figure 1:
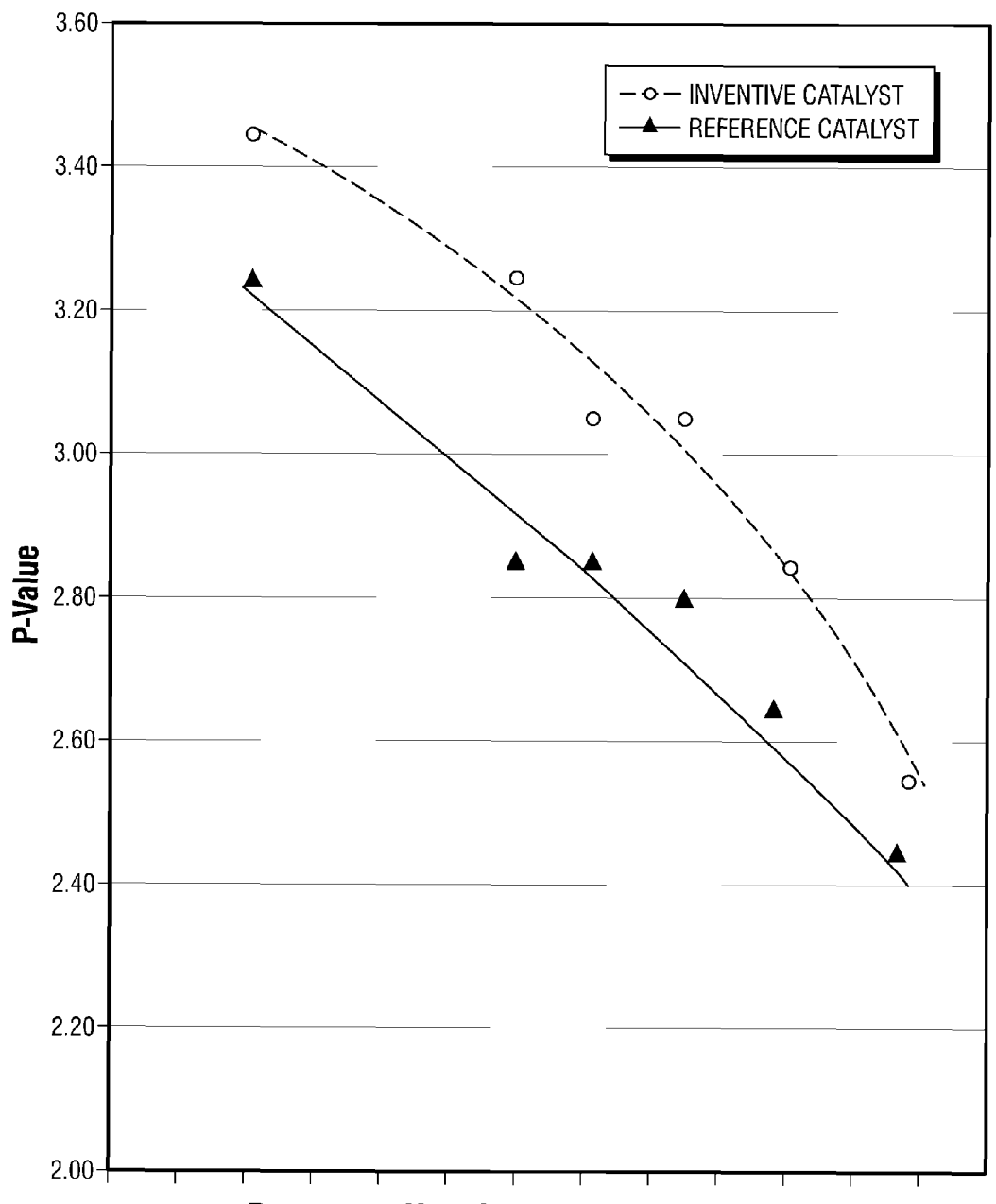
FIG. 1 presents plots of P-values of the yielded product as a function of vanadium deposition on catalyst for the inventive Catalyst A and for the comparison Catalyst B.

The inventive catalyst composition is particularly useful in the hydroprocessing of heavy hydrocarbon feedstocks. One beneficial property of the inventive catalyst composition is its vanadium removal activity when used in the treatment of heavy hydrocarbon feedstocks having significant concentrations of vanadium. The inventive composition exhibits over other comparative compositions an enhanced vanadium removal activity.

Another of the beneficial properties of the inventive catalyst composition is its ability to provide for the hydrotreatment of a heavy hydrocarbon feedstock to yield a treated product that has an enhanced product stability as reflected by its P-value, and, moreover, the catalyst composition further provides for a significantly better product stability (i.e., P-value) when the catalyst has been loaded with vanadium from its use in the treatment of vanadium containing feedstocks as compared with the performance of other vanadium loaded catalysts. This property is desirable when the heavy hydrocarbon feedstock that is being treated contains a high vanadium content that needs to be removed.

It is believed that the unique physical characteristics of the inventive co-mulled and calcined composition provide for its excellent catalytic performance properties. In particular, the inventive catalyst composition comprises a calcined particle having a pore structure such that at least 20% of its total pore volume is contained in the pores having pore diameters greater than 5,000 Å. The calcined particle further can have less than 70% of its total pore volume in the pores having pore diameters in the range of from 70 Å to 250 Å. The pore structure of the calcined particle is as measured by standard mercury penetration methodology known to those skilled in the art.

It is believed that the unique pore structure of the calcined particle of the inventive catalyst and other difficult to define properties are imparted to the calcined particle through the method by which the calcined particle of the composition is prepared, e.g., by co-mulling, by controlling the pH of the mull mixture during preparation, and by controlling of the calcination temperature of the formed particle. It is these properties that contribute to the improved performance and activity attributes of the inventive catalyst composition. Among these improved performance properties, for example, is as noted the ability to provide for the yield of a treated heavy hydrocarbon feedstock that has an enhanced stability, or P-value, and the enhanced resistance to the negative impact of vanadium deposition on the composition.

One required feature of the calcined particle of the invention is for it to be prepared by the co-mulling of its individual support and hydrogenation metal components instead of by other methods such as impregnation of a support material with the hydrogenation metals. It is believed that the specific method of co-mulling the starting materials to prepare a co-mulled mixture that is formed into particles that are calcined contributes to providing a catalyst composition having unique properties over other compositions. It is further recognized that the specific process conditions by which the inventive composition is prepared are controlled in such a way as to provide a co-mulled and calcined particle that has unique physical properties and exhibits improved catalytic performance over comparative co-mulled compositions.

The first step of the inventive method includes combining the starting materials of the catalyst to form a mixture. The starting materials are to be co-mulled to provide a co-mulled mixture. The essential starting materials in the preparation of the co-mulled mixture include molybdenum trioxide that is preferably in the form of finely divided particles that may be as a dry powder or as particles in a suspension or slurry, and an inorganic oxide material, such as, inorganic oxide material selected from the group consisting of alumina, silica and alumina-silica. Also, Group VIII metal particles are included in the starting materials to form the co-mulled mixture.

The Group VIII metal particles include either a nickel component, preferably as nickel oxide, or a cobalt component, preferably as cobalt oxide, or both Group VIII metal components. The Group VIII metal particles are combined with the molybdenum trioxide and inorganic oxide material in the formation of the co-mulled mixture. The co-mulled mixture, thus, comprises, consists essentially of, or consists of the starting components of inorganic oxide powder, molybdenum trioxide powder, and one or more Group VIII metal components that are preferably in particulate form.

The nickel component may be selected from nickel oxide that is preferably in the form of finely divided particles that may be as a dry powder or as particles in a suspension or slurry. The cobalt component may be selected from cobalt oxide that also is preferably in the form of finely divided particles that may be as a dry powder or as particles in a suspension or slurry, and an inorganic oxide material, such as, inorganic oxide material selected from the group consisting of alumina, silica and alumina-silica.

The amount of molybdenum trioxide contained in the co-mulled mixture should be such as to provide for the calcined particle to have a molybdenum content that is in the range of from or about 2 weight percent (wt. %) to or about 12 wt. %, with the weight percent being based on the molybdenum as MoO$_3$, regardless of its actual form, and the total weight of the calcined particle on a dry basis. It is preferred for the calcined particle to have a molybdenum content in the range of from 2.5 wt. % to 11 wt. %, and, more preferred, the molybdenum content of the calcined particle is in the range of from 3 wt. % to 10 wt. %.

The nickel content of the co-mulled mixture should be such as to provide for the calcined particle to have a nickel content that is in the range of from or about 0.2 wt. % to or about 6 wt. %, with the weight percent being based on the nickel as NiO, regardless of its actual form, and the total weight of the calcined particle on a dry basis. It is preferred for the calcined particle to have a nickel content in the range of from 0.5 wt. % to 5 wt. %, and, more preferred, the nickel content of the calcined particle is in the range of from 0.8 wt. % to 4 wt. %.

Cobalt is not necessarily a required component of the co-mulled mixture or the calcined particle, but it may be a preferred component of these compositions. In the embodiments of the invention that include cobalt as a component of the inventive composition, it is desirable for the cobalt content of the co-mulled mixture to be such as to provide for a calcined particle having a cobalt content in the range of from or about 0.2 wt. % to or about 6 wt. %, with the weight percent being based on the cobalt as CoO, regardless of its actual form, and the total weight of the calcined particle on a dry basis. It is preferred for the calcined particle to have a cobalt content in the range of from 0.5 wt. % to 5 wt. %, and, more preferred, the cobalt content of the calcined particle is in the range of from 0.8 wt. % to 4 wt. %.

While phosphorus is not a necessary component of the inventive catalyst it is a preferred embodiment for the inventive catalyst composition to further include a phosphorous compound. The concentration of phosphorous in the hydroconversion catalyst composition can be in the range of from or about 0.05 to or about 6 weight percent, or about 0.05 weight percent to about 5 weight percent, phosphorus as P$_2$O$_5$ based on the total weight of the hydroconversion catalyst composition. But, preferably, the concentration of phosphorous is in the range of from 0.1 weight % to about 2 weight %, and, most preferably, from 0.2 to 1.5 weight %.

The amount of inorganic oxide material co-mulled into the co-mulled mixture is such as to provide an amount in the range of from in the range of from 50 to 97 wt. % inorganic oxide material in the calcined particles, with the weight percent being based on the total weight of the calcined particle. Preferably, the amount of inorganic oxide material in the calcined particle is in the range of from 55 to 96 wt. %, and, most preferably, from 60 to 95 wt. %.

The co-mulling of components and formation of the co-mulled mixture may be done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batchwise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include, but are not limited to, single or double screw extruders, trough-and-screw mixers and pug mills.

The mixing of the starting materials of the co-mulled mixture may be conducted during any suitable time period necessary to properly homogenize the co-mulled mixture. Generally, the blending time may be in the range of upwardly to 2 or more than 3 hours. Typically, the blending time is in the range of from 0.1 hours to 3 hours.

The pH of the co-mulled mixture is carefully controlled so as to provide for a final calcined particle that has the required pore structure as described above. The maintenance of the pH of the mull mixture during the mixing or co-mulling of the starting materials to within a specific range can contribute to providing for a calcined particle having a relatively large percentage of its total pore volume that is contained within the pores having a pore diameter greater than 5000 Å. Typically, the pH of the co-mulled mixture should be greater than 6. In a preferred embodiment, the pH of the co-mulled mixture is kept within the range of at least 6 and less than 9 during the co-mulling step and the preparation of the co-mulled mixture. In a more preferred embodiment, the pH of the co-mulled mixture is maintained in the range of from 6.5 to 8.5, and, most preferred, from 6.5 to 8. The pH may be controlled by the addition of ammonium salts or ammonium hydroxide to the co-mulled mixture.

The term "co-mulling" is used broadly in this specification to mean that at least the recited starting materials are mixed together to form a mixture of the individual components of the mixture that is preferably a substantially uniform or homogeneous mixture of the individual components of such mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

As already noted, it is an important aspect of the inventive method for at least a major portion of the molybdenum source of the catalyst to be predominantly molybdenum trioxide and a major portion of the nickel source of the catalyst to be predominantly nickel oxide and a major portion of the cobalt source of the catalyst, if cobalt is used as a component, to be predominantly cobalt oxide. In the mixing or co-mulling of the starting materials of the catalyst, it is preferred for the molybdenum trioxide to be in a finely divided state either as a finely powdered solid or as fine particles in a suspension or slurry. It is best for the particle sizes of the particulate molybdenum trioxide (molybdenum trioxide powder) used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm). Similarly, in the mixing or co-mulling of the starting materials of the catalyst, it is preferred for the nickel oxide to be in a finely divided state either as a finely powdered solid or as fine particles in a suspension or slurry.

It is best for the particle sizes of the particulate nickel oxide that is used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm) when mixing or co-mulling the nickel oxide with the other starting materials of the catalyst.

When cobalt oxide is used in the preparation of the catalyst, it is preferred for the cobalt oxide to also be in a finely divided state either as a finely powdered solid or as fine particles in a suspension or slurry. It is best for the particle sizes of the particulate cobalt oxide used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm).

While it is not known with certainty, it is believed that it is advantageous to the invention for the molybdenum trioxide that is used in the manufacture of the inventive catalyst to be in the form of as small particles as is practically possible; so, therefore, it is not desired to have a lower limit on the size of the molybdenum trioxide particles used in the manufacture of the catalyst. However, it is understood that the particle size of the molybdenum trioxide used in the manufacture of the catalyst will generally have a lower limit to its size of greater than 0.2 microns. Thus, the particle size of the molybdenum trioxide used in the formation of the mixture in the manufacture of the inventive catalyst is preferably in the range of from 0.2 to 150 μm, more preferably, from 0.3 to 100 μm, and, most preferably, from 0.5 to 75 μm. Typically, the size distribution of the molybdenum trioxide particles, whether in a dry powder or a suspension or otherwise, is such that at least 50 percent of the particles have a maximum dimension in the range of from 2 to 15 μm.

An essential aspect of the inventive composition is for it to have the right pore structure. This means that a significant fraction or percentage of the total pore volume of the calcined particle should be contained in macropores having pore diameters exceeding 5,000 Å and that a maximum fraction or percentage of the total pore volume of the catalyst should be contained in mesopores having pore diameters in the range of from 70 Å to 250 Å.

The pore structure of the calcined particle is controlled or manipulated by the way it is prepared, including the use of the co-mulling method as opposed to using some other method such as impregnation. Also, controlled calcination conditions are utilized to provide a calcined particle with the required pore structure. And, the pH of the mull mixture can additionally be controlled so as to provide the calcined particle with a desirable pore structure.

It is preferred for the calcined particle to have a pore structure such that at least 20% of its total pore volume is contained within its pores having diameters greater than 5,000 Å. It is more preferred for at least 22% of the total pore volume of the calcined particle to be contained within the pores having diameters greater than 5,000 Å, and, most preferred, at least 23% of the total pore volume of the calcined particle is contained in the pores of a diameter greater than 5,000 Å.

Regarding the pore volume that is contained in the mesopores of the calcined particle, it is preferred for less than 70% of the total pore volume of the calcined particle to be contained within the pores having diameters in the range of from 70 Å to 250 Å. It is more preferred for the mesopore pore volume to be less than 68% of the total pore volume of the calcined particle. But, it is most preferred for less than 65% of the total pore volume of the calcined particle to be contained within the pores having diameters in the range of from 70 Å to 250 Å.

The total surface area of the calcined particle can also be an important physical attribute of the inventive catalyst composition. The calcined particle should have a surface area that is greater than 150 m$^2$/gram, but, preferably, the surface area can exceed 200 m$^2$/gram, more preferably, it can exceed 225 m$^2$/gram, and, most preferably, it exceeds 250 m$^2$/gram.

The aforedescribed pore structure of the calcined particle is considered to be a significant contributor to the particularly good catalytic performance characteristics of the calcined particle when used in applications involving the hydrotreatment of heavy hydrocarbon feedstocks having high sulfur and metal concentrations, and, in particular, heavy hydrocarbon feedstocks with high concentrations of vanadium.

Once the starting materials are properly mixed and formed into the shaped or formed particles, a drying step may advantageously be used for removing certain quantities of water or volatiles that are included within the mixture or formed particles. The drying of the formed particles may be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 482° C. (900° F.) to 787.7° C. (1450° F.). The temperature conditions at which the particles are calcined can be important to the control of the pore structure of the final calcined mixture. Due to the presence of the molybdenum trioxide in the formed particles, the calcination temperature required to provide for a calcined mixture having the required pore structure is higher than typical temperatures required to calcine other compositions containing inorganic oxide materials, especially those that do not contain molybdenum trioxide. But, in any event, the temperature at which the formed particles are calcined to provide the finally calcined particle is controlled so as to provide the finally calcined particles that have the pore structure properties as described in detail herein. The preferred calcination temperature is in the range of from 510° C. (950° F.) to 730° C. (1346° F.), and, most preferably, it is from 540° C. (1004° F.) to 705° C. (1301° F.).

The calcined particle is particularly useful as a high stability hydroprocessing catalyst for use in the hydroprocessing of a heavy feedstock stream that has high levels of pitch, organic metals, for example, nickel and vanadium compounds, and sulfur. Because of its enhanced resistance to the effects of vanadium deposition, the calcined particle is especially useful in the processing of heavy hydrocarbon feedstocks that have particularly high concentrations of vanadium.

Prior to its use, the calcined particle may, but is not required to, be sulfided or activated by any of the methods known to those skilled in the art. Generally, in its use in the hydroprocessing of a hydrocarbon feedstock, the calcined particle is contained within a reaction zone, such as that which is defined by a reactor vessel, wherein a hydrocarbon feedstock is contacted with the calcined particle under suitable hydroprocessing reaction conditions and from which a treated hydrocarbon product is yielded.

The preferred hydrocarbon feedstock of the inventive process is a heavy hydrocarbon feedstock. The heavy hydrocarbon feedstock may be derived from any of the high boiling temperature petroleum cuts such as atmospheric tower gas oils, atmospheric tower bottoms, vacuum tower gas oils, and vacuum tower bottoms or reside. It is a particularly useful aspect of the inventive process to provide for the hydroprocessing of a heavy hydrocarbon feedstock that can be generally defined as having a boiling temperature at its 5% distillation point, i.e. T(5), that exceeds 300° C. (572° F.) as determined by using the testing procedure set forth in ASTM D-1160. The invention is more particularly directed to the hydroprocessing of a heavy hydrocarbon feedstock having a T(5) that exceeds 315° C. (599° F.) and, even, one that exceeds 340° C. (644° F.).

The heavy hydrocarbon feedstock further may include heavy hydrocarbons that have boiling temperatures above 538° C. (1000° F.). These heavier hydrocarbons are referred to herein as pitch, and, as already noted, it is recognized that one of the special features of the inventive catalyst or process is that it is particularly effective in the hydroconversion of the pitch content of a heavy hydrocarbon feedstock. The heavy hydrocarbon feedstock may include as little as 10 volume percent pitch or as much as 90 volume percent pitch, but, generally, the amount of pitch included in the heavy hydrocarbon feedstock is in the range of from 20 to 80 volume percent. And, more typically, the pitch content in the heavy hydrocarbon feedstock is in the range of from 30 to 75 volume percent.

The heavy hydrocarbon feedstock further may include a significantly high sulfur content. One of the special features of the invention is that it provides for both the desulfurization of the heavy hydrocarbon feedstock and the conversion of the pitch to lighter hydrocarbons having lower boiling temperatures than those of the pitch hydrocarbons. The sulfur content of the heavy hydrocarbon feedstock is primarily in the form of organic sulfur-containing compounds, which may include, for example, mercaptans, substituted or unsubstituted thiophenes, heterocyclic compounds, or any other type of sulfur-containing compound.

A feature of the invention is that it provides for the desulfurization of the heavy feedstock that has a significantly high sulfur content, such as a sulfur content greater than 1 weight percent, so as to provide for a treated hydrocarbon product having a reduced sulfur content, such as a sulfur content of less than 1 weight percent. When referring herein to the sulfur content of either the heavy hydrocarbon feedstock or the treated hydrocarbon product, the weight percents are determined by the use of testing method ASTM D-4294. The inventive process is particularly useful in the processing of a heavy hydrocarbon feedstock that has a sulfur content exceeding 2 weight percent, and with such a heavy hydrocarbon feedstock, the sulfur content may be in the range of from 2 to 8 weight percent.

The inventive catalyst and process is especially useful in the processing of a heavy hydrocarbon feedstock having an especially high sulfur content of exceeding 3 or even 4 weight percent and being in the range of from 3 to 7 weight percent or even from 4 to 6.5 weight percent.

The inventive process utilizes the inventive catalyst in the hydroprocessing of the heavy hydrocarbon feedstock to provide for the simultaneous desulfurization and conversion of Microcarbon residue and removal of vanadium and nickel. In this process, the heavy hydrocarbon feedstock is contacted with the inventive catalyst under suitable hydrodesulfurization and hydroconversion process conditions and the treated hydrocarbon product is yielded. The treated hydrocarbon product should have a reduced sulfur content that is below that of the heavy hydrocarbon feedstock, such as a sulfur content of less than 1 weight percent. It is recognized that the inventive process, however, may have the capability of effectively desulfurizing the heavy hydrocarbon feedstock to provide the treated hydrocarbon product having a reduced sulfur content of less than 0.5 and even less than 0.4 weight percent based on the amount of catalyst used relative to feed volume.

The inventive catalyst composition also provides for the hydroconversion of a heavy hydrocarbon feedstock to yield a product having a particularly high P-value. The P-value (peptization value) is a numerical value that is an indicator of the flocculation tendency of the asphaltenes contained in a hydrocarbon mixture. The determination of the P-value is the method as described by J. J. Heithaus in "Measurement and Significance of Asphaltene Peptization", Journal of Institute of Petroleum, Vol. 48, Number 458, February 1962, pp. 45-53, which publication is incorporated herein by reference.

A high P-value for a hydrocarbon mixture indicates that it is stable and a low P-value for a hydrocarbon mixture indicates that it is not as stable in that there is a greater tendency for precipitation of the asphaltenes contained in the hydrocarbon mixture. It is one of the advantages of the inventive catalyst composition that it provides for the yield of a product from the hydrotreatment of a heavy hydrocarbon feedstock that has a relatively high P-value.

The calcined particle (catalyst) of the invention may be employed as a part of any suitable reactor system that provides for the contacting of the catalyst with the heavy hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the heavy hydrocarbon feedstock into the reactor vessel, and a reactor effluent outlet means, such as an effluent outlet nozzle, for withdrawing the reactor effluent or the treated hydrocarbon product from the reactor vessel.

The inventive process generally operates at a hydroprocessing (hydroconversion and hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig).

The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone of the inventive process is generally such as to provide a liquid hourly space velocity (LHSV) in the range of from 0.01 $hr^{-1}$ to 5 $hr^{-1}$. The term "liquid hourly space velocity", as used herein, means the numerical ratio of the rate at which the heavy hydrocarbon feedstock is charged to the reaction zone of the inventive process in volume per hour divided by the volume of catalyst contained in the reaction zone to which the heavy hydrocarbon feedstock is charged. The preferred LHSV is in the range of from 0.05 $hr^{-1}$ to 4 $hr^{-1}$, more preferably, from 0.1 $hr^{-1}$ to 3 $hr^{-1}$ and, most preferably, from 0.2 $hr^{-1}$ to 3 $hr^{-1}$.

It is preferred to charge hydrogen along with the heavy hydrocarbon feedstock to the reaction zone of the inventive process. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The following examples are presented to further illustrate the invention, but they are not to be construed as limiting the scope of the invention.

Example I

This Example I describes the preparation of Catalysts A and B.

Catalyst A (Inventive Catalyst)

The Catalyst A was prepared by first combining 2100 parts by weight alumina, 139.2 parts by weight nickel nitrate (Ni(NO$_3$)$_2$)$_6$H$_2$O dissolved in 644.18 parts by weight deionized water by heating, and 900 parts by weight crushed regenerated Co/Mo/P hydrotreating catalyst within a Muller mixer along with 64.5 parts by weight 69.9% concentrated nitric acid. A total of 3222.9 parts by weight of water was added to these components during the mixing. The components were mixed for approximately 30 minutes. 60 parts of a commercial extrusion aid and 133.6 parts of ammonium hydroxide (29.2% ammonia) were added to the mull mix and the mull mix further mixed for 5 minutes. The mixture had a pH of 7.0 and an LOI of 61.6 weight percent. The mixture was then extruded using 1.3 mm dies to form 1.3 extrudate particles. The extrudate particles were then dried in air for a period of several hours at a temperature of 125° C.

Aliquot portions of the dried extrudate particles were calcined in air each for a period of two hours at a temperature of 704° C. (130° F.). The final calcined mixture contained 1 weight percent nickel metal (1.2 wt. % as NiO), 1.2 weight percent cobalt metal (1.4 wt. % as CoO) and 4.1% molybdenum metal (6.1 wt. % as MoO$_3$) and 88.1 weight percent of alumina and 0.7% of phosphorus pentaoxide.

The following Table 1 presents certain properties of the calcined catalyst. As may be seen from the pore properties presented in Table 1, the percentage of the total pore volume contained in the macropores having a pore diameter of greater than 5,000 Angstroms (Å) is more than 20% percent and a pore diameter of from 70-250 Å is at most 70%.

Catalyst B (Comparison Catalyst)

A mixture comprising 70% alumina powder and 30% fines from crushed commercial catalyst was prepared. The mixture was mulled in a 1% aqueous solution of nitric acid for 35 minutes, extruded into 1.3 trilobe cylinders, dried at 100° C. (212° F.) for 3 hours and calcined at 677° C. for 2 hours. Analysis of the resulting catalyst, designated Catalysts B, showed it to have the properties shown in Table 1.

TABLE 1

Properties of Catalyst A and Catalyst B

| Properties | Catalyst A | Catalyst B |
| --- | --- | --- |
| Mix Type | co-mulled | co-mulled |
| MoO$_3$ | 6.1 | 6.1 |

TABLE 1-continued

Properties of Catalyst A and Catalyst B

| Properties | Catalyst A | Catalyst B |
| --- | --- | --- |
| NiO | 1.23 | 1.2 |
| CoO | 1.38 | 0 |
| P$_2$O$_5$ | 0.72 | 1.089 |
| Mix pH | 7.0 | 5.2 |
| Calcination Temperature | 704° C. | 677° C. |
| Hg Pore Size Dist. (Angstroms) | | |
| <70 | 2.6 | 3.9 |
| 70-250 | 60.7 | 62.4 |
| >250 | 36.7 | 33.5 |
| >350 | 32.2 | 4.7 |
| >1000 | 33.5 | 28.4 |
| >5000 | 24.3 | 18.5 |
| Total Pore Volume, cc/g | 0.923 | 0.97 |
| Medium Pore Diameter, Å | 113 | 109 |
| Surface Area, m$^2$/g | 254 | 147 |

It is noted that the percentage of the total pore volume of Catalyst A contained in its pores having a pore size greater than 5,000 Angstroms exceeds 20% by a significant amount. The pore structure of Catalyst A is such that at least 22% of its total pore volume is contained in the pores having a diameter of greater than 5,000 Å, and, even more than 23% of the total pore volume of Catalyst A is contained in the pores having a diameter of greater than 5000 Å. The percentage of the total pore volume of Catalyst B contained in its pores having a diameter of greater than 5000 Å, on the other hand, is significantly less than 20%. It is further noted that significantly less than 70% of the total pore volume of Catalyst A is contained in pores of a diameter in the range of from 70 to 250 Å.

In the preparation of Catalyst A, the co-mulled mixture had a pH in the range of from 6 to 9, while, on the other hand, the pH of the co-mulled mixture used in the preparation of Catalyst B, was outside this range and was significantly below a pH of 6. Additionally, the comparison Catalyst B had a material absence of a cobalt component. It is further noted that Catalyst B has a very low surface area of less than 150 m$^2$/g as compared to Catalyst A which has a surface of greater than 150 m$^2$/g. The surface area of Catalyst A is even greater than 200 m$^2$/g and 225 m$^2$/g, and, even greater than 250 m$^2$/g.

Example II

This Example II describes one of the methods used in testing the catalysts described in Example I.

This method provided for the processing of a feedstock having significant sulfur, pitch (1000° F.$^+$ boiling material) and metal (vanadium and nickel) concentration to yield a product having specified sulfur concentration and lower metal content. The reactor temperature was operated at several temperatures, 700° F., 725° F., 742° F., and 752° F.

Catalyst A was loaded into a 1.5875 cm (⅝ inch) ID by 127 cm (50 inch) stainless steel tube reactor. The tube reactor was equipped with thermocouples placed in a 0.635 cm (¼ inch) thermowell inserted concentrically into the catalyst bed, and the reactor tube was held within a 132 cm (52 inch) long 5-zone furnace with each of the zones being separately controlled based on a signal from a thermocouple.

The catalyst bed was activated by feeding at ambient pressure a gas mixture of 5 vol. % H$_2$S and 95 vol. % H$_2$ to the reactor at a rate of 1.5 LHSV while incrementally increasing the reactor temperature at a rate of 100° F./hr up to 400° F. The catalyst bed was maintained at a temperature of 400° F. for two hours and then the temperature was incrementally increased at a rate of 100° F./hr to a temperature of 600° F., where it was held for one hour followed again by an incremental increase in the temperature at a rate of 75° F./hr up to a temperature of 700° F., where it was held for two hours before cooling the catalyst bed temperature down to the ambient temperature. The catalyst bed was then pressured with pure hydrogen at 1000 psig, and the temperature of the catalyst bed was incrementally increased at a rate of 100° F./hr to 400° F. The reactor was then charged with feedstock while the temperature of the reactor was held at 400° F. for one hour. The catalyst bed temperature was then incrementally increased at a rate of 50° F./hr up 700° F., from which point the run was started.

The feedstock charged to the reactor was a Middle Eastern long residue. The distillation properties of the feedstock as determined by ASTM Method D7169 are presented in Table 2. Table 3 presents certain other properties of the feedstock.

TABLE 2

Distillation of Feedstock

| Wt. % | Temp., ° F. |
|---|---|
| IBP | 522.0 |
| 10 | 721.0 |
| 20 | 806.0 |
| 30 | 871.0 |
| 40 | 932.0 |
| 50 | 999.0 |
| 60 | 1074 |
| 70 | 1159.0 |
| 80 | 1260.0 |
| FBP | 1351. |

TABLE 3

Other Properties of the Feedstock

| Sulfur, wt. % | 4.575 |
|---|---|
| Hydrogen, wt. % | 11.010 |
| Nitrogen, wt. % | 0.260 |
| Micro-Carbon, wt. % | 4.575 |
| P-Value | 2.8 |
| Ni | 20.6 |
| V | 70.0 |
| API | 17.15 |
| Pitch, wt. % | 49.10 |
| Viscosity @ 60° C., cSt | 6067 |

The feedstock was charged to the reactor along with hydrogen gas. The reactor was maintained at a pressure of 1900 psig and the feedstock was charged to the reactor at a rate so as to provide a liquid hourly space velocity (LHSV) of 1 $hr^{-1}$ and the hydrogen was charged at a rate of 4,000 SCF/bbl. The initial temperature of the reactor was set at 371° C. (700° F.).

This method provided for the processing of a feedstock having significant sulfur, metal and pitch contents to yield a product having reduced levels of sulfur, pitch and metal and a product liquid that was stable. The reactor temperature was varied in order to ascertain stability of liquid product.

To illustrate certain features and benefits of the invention, FIG. 1 is presented. In FIG. 1 are illustrative plots of P-values of a yielded product as a function of vanadium deposition on catalyst for the inventive Catalyst A and for the comparison Catalyst B. As may be observed from the data presented in FIG. 1, the inventive Catalyst A provides for the yield of a product having a stability, as reflected by its P-value, that is significantly higher than the stability of the product provided by the use of comparison Catalyst B. Also, while the P-value of the product yielded from the use of both catalysts declines with increasing amounts of vanadium that is deposited on the catalyst, the inventive Catalyst A continues to provide for a much higher product stability than does the comparison Catalyst B at all levels of vanadium deposition.

Figure 2:
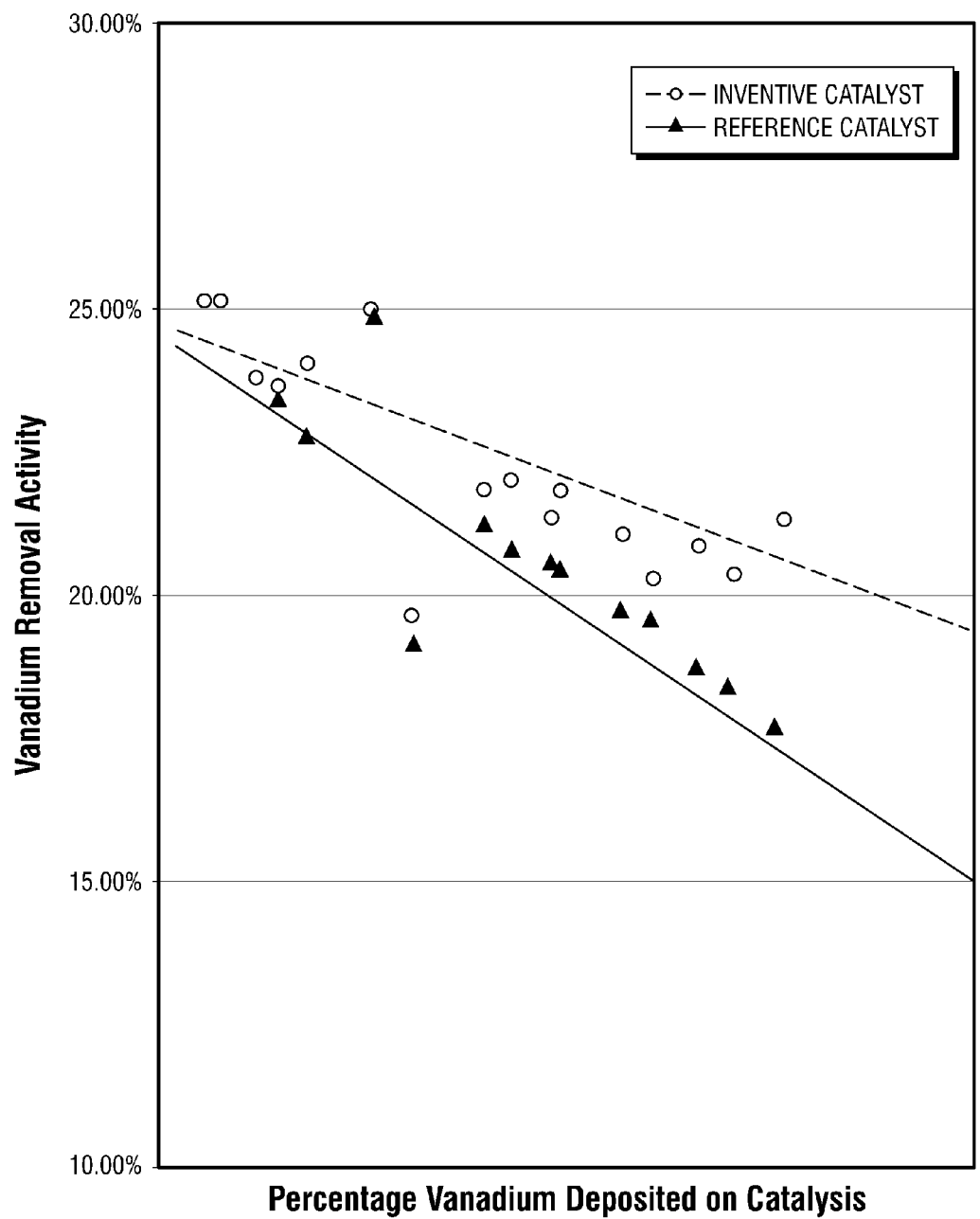
FIG. 2 presents plots of the vanadium removal activity as a function of vanadium deposition on catalyst for the inventive Catalyst A and for the comparison Catalyst B.

FIG. 2 presents plots that illustrate the vanadium removal activity as a function of vanadium deposition on catalyst for the inventive Catalyst A and for the comparison Catalyst B. As can be seen from FIG. 2, the difference between the vanadium removal activity of the inventive Catalyst A and that of the comparison Catalyst B increases with increasing amounts of vanadium deposition on each catalyst. In other words, the slope, which is defined by the change in the vanadium removal activity divided by the change in the percentage vanadium deposition on the catalyst, of the linear function property for the comparison Catalyst B is greater than such slope for the inventive Catalyst A. The prior art catalyst, therefore, loses its vanadium removal activity at a greater rate than does the inventive catalyst with increases in the amount of vanadium that is deposited thereon.

Figure 3:
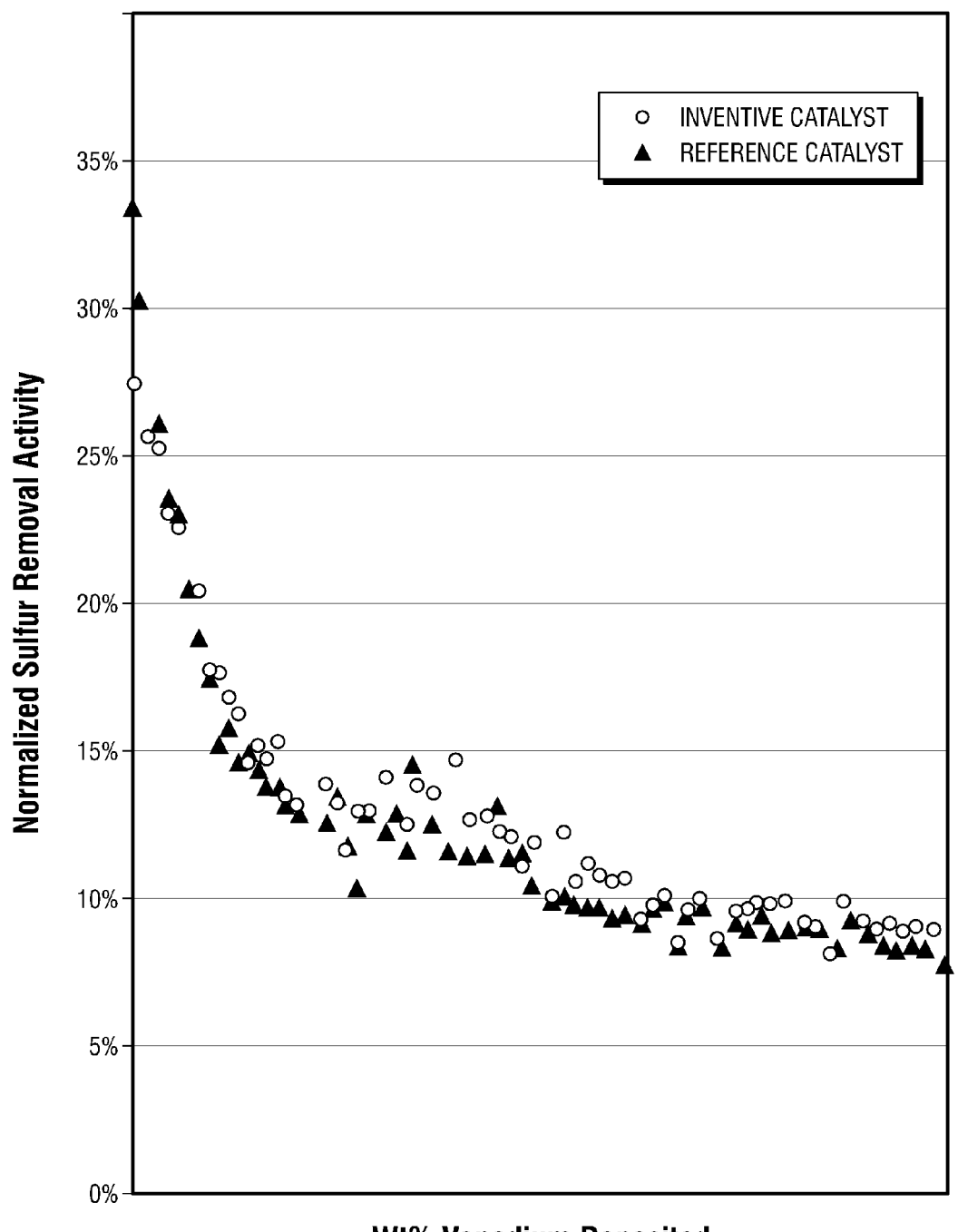
FIG. 3 presents plots of the normalized sulfur removal activity as a function of vanadium deposited on catalyst for the inventive Catalyst A and for the comparative Catalyst B.

FIG. 3 includes illustrative plots of the normalized sulfur removal activity as a function of vanadium deposited on catalyst for the inventive Catalyst A and for the comparative Catalyst B. As can be seen from FIG. 3, the normalized sulfur removal activity of the inventive Catalyst A is close to or slightly better than that of the comparative Catalyst B at any given level of vanadium deposition on the catalyst.

Figure 4:
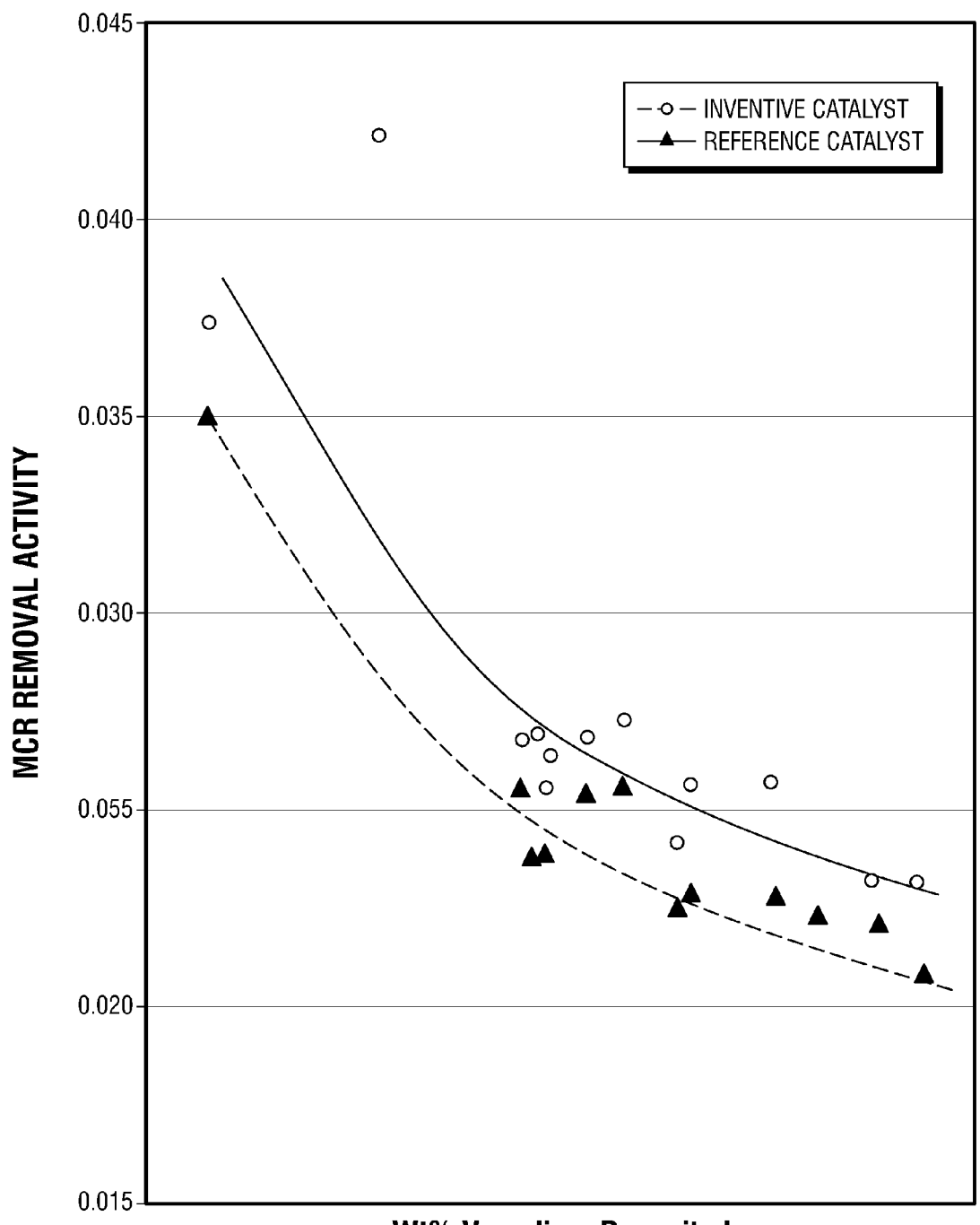
FIG. 4 presents plots of the microcarbon residue (MCR) removal activity as a function of vanadium deposited on the catalyst for the inventive Catalyst A and for the comparison Catalyst B.

FIG. 4 presents illustrative plots of the microcarbon residue (MCR) removal activity as a function of vanadium deposited on the catalyst for the inventive Catalyst A and for the comparison Catalyst B. For a given amount of vanadium that is deposited on the catalyst, the MCR removal activity of inventive Catalyst A is incrementally greater than that of comparison Catalyst B.

That which is claimed is:

1. A hydroprocessing catalyst having an enhanced vanadium removal activity and providing for treating a heavy hydrocarbon feedstock to yield a treated product having enhanced product stability, wherein said hydroprocessing catalyst comprises: a calcined particle comprising a co-mulled mixture made by co-mulling inorganic oxide powder, molybdenum trioxide powder, and Group VIII metal particles and then forming said co-mulled mixture into a particle that is calcined to thereby provide said calcined particle, wherein said calcined particle has a total surface area exceeding 250 $m^2$/gram and a pore structure such that at least 20% of the total pore volume of said calcined particle is in the pores of said calcined particle having pore diameters greater than 5,000 Å and less than 70% of the total pore volume of said calcined particle is in the pores of said calcined particle having pore diameters in the range of from 70 Å to 250 Å, as measured by mercury penetration, and wherein said calcined particle has a molybdenum content in the range of from 3 weight percent to 12 weight percent with the weight percent being based upon the molybdenum as $MoO_3$ and the total weight of said calcined particle, a nickel content in the range of from 0.2 weight percent to 6 weight percent based on the nickel as NiO and the total weight of said calcined particle, and a cobalt content in the range of from 0.2 weight percent to 6 weight percent with the weight percent being based upon the cobalt as CoO and the total weight of said calcined particle.

2. A hydroprocessing catalyst as recited in claim 1, wherein the calcining of said particle is conducted under a controlled temperature condition at a calcination temperature in the range of from 482° C. (900° F.) to 787.7° C. (1450° F.) for a calcination time period so as to provide said calcined particle having said pore structure.

3. A hydroprocessing catalyst as recited in claim 2, wherein said molybdenum trioxide powder of said co-mulled mixture is in a finely divided state of particulate molybdenum trioxide either as a finely divided powdered solid or as a suspension wherein said particulate molybdenum trioxide is of a particle size having a maximum dimension of less than 500 μm.

4. A hydroprocessing catalyst as recited in claim 3, wherein said particulate molybdenum trioxide used in the formation of said co-mulled mixture comprises particles having a maximum dimension in the range of from 0.2 to 150 μm.

5. A hydroprocessing catalyst as recited in claim 3, wherein at least 50 percent of said particulate molybdenum trioxide are particles having a maximum dimension in the range of from 2 to 15 μm.

6. A hydroprocessing catalyst as recited in claim 1, wherein said inorganic oxide material is selected from the group consisting of alumina, silica and alumina-silica.

7. A hydroprocessing catalyst as recited in claim 1, wherein said co-mulling step is conducted such that said co-mulled mixture has a pH that is maintained in the range of from 6 to 9 by addition of ammonium salts or ammonium hydroxide.

8. A hydroprocessing catalyst as recited in claim 1, wherein said co-mulled mixture consists essentially of molybdenum trioxide, cobalt oxide, nickel oxide, a phosphorous component and an inorganic oxide material.

9. A process comprising: contacting a heavy hydrocarbon feedstock having a nickel content in the range of from 0.1 ppmw to 250 ppmw, a vanadium content in the range of from 0.3 ppmw to 250 ppmw, and a sulfur content in the range of from 0.5 wt % to 8 wt % with the catalyst of claim 1.

10. A method of making a hydroprocessing catalyst having an enhanced vanadium removal activity and providing for treating a heavy hydrocarbon feedstock to yield a treated product having enhanced product stability, wherein said method comprises: co-mulling inorganic oxide powder, molybdenum trioxide powder, and Group VIII metal particles to form a co-mulled mixture; forming said co-mulled mixture into a particle; and calcining said particle under a controlled temperature condition at a calcination temperature in the range of from 482° C. (900° F.) to 787.7° C. (1450° F.) for a calcination time period so as to provide a calcined particle having a total surface area exceeding 250 m²/gram and a pore structure such that at least 20% of the total pore volume of said calcined particle is in the pores of said calcined particle having pore diameters greater than 5,000 Å and less than 70% of the total pore volume of said calcined particle is in the pores of said calcined particle having pore diameters in the range of from 70 Å to 250 Å, as measured by mercury penetration; wherein the amounts of inorganic oxide powder, molybdenum trioxide powder, and Group VIII metal particles used to form said particle are such as to provide said calcined particle having a molybdenum content in the range of from 3 weight percent to 12 weight percent with the weight percent being based upon the molybdenum as $MoO_3$ and the total weight of said calcined particle, a nickel content in the range of from 0.2 weight percent to 6 weight percent based on the nickel as NiO and the total weight of said calcined particle, and a cobalt content in the range of from 0.2 weight percent to 6 weight percent with the weight percent being based upon the cobalt as CoO and the total weight of said calcined particle.

11. A method as recited in claim 10, wherein said molybdenum trioxide powder of said co-mulled mixture is in a finely divided state of particulate molybdenum trioxide either as a finely divided powdered solid or as a suspension wherein said particulate molybdenum trioxide is of a particle size having a maximum dimension of less than 500 μm.

12. A method as recited in claim 11, wherein said particulate molybdenum trioxide used in the formation of said co-mulled mixture comprises particles having a maximum dimension in the range of from 0.2 to 150 μm.

13. A method as recited in claim 11, wherein at least 50 percent of said particulate molybdenum trioxide are particles having a maximum dimension in the range of from 2 to 15 μm.

14. A method as recited in claim 10, wherein said inorganic oxide material is selected from the group consisting of alumina, silica and alumina-silica.

15. A method as recited in claim 10, wherein said co-mulling step is conducted such that said co-mulled mixture has a pH that is maintained in the range of from 6 to 9 by addition of ammonium salts or ammonium hydroxide.

16. A method as recited in claim 10, wherein said co-mulled mixture consists essentially of molybdenum trioxide, cobalt oxide, nickel oxide, a phosphorous component and an inorganic oxide material.

17. A composition made by the method of claim 10.

18. A process comprising contacting a heavy hydrocarbon feedstock having a nickel content in the range of from 0.1 ppmw to 250 ppmw, a vanadium content in the range of from 0.3 ppmw to 250 ppmw, and a sulfur content in the range of from 0.5 wt % to 8 wt % with a composition made by the method of claim 10.

* * * * *